Sept. 29, 1953      N. B. SANDBERG      2,654,018
ELECTRICALLY HEATED STEAM-BATH STOVE
Filed May 8, 1952
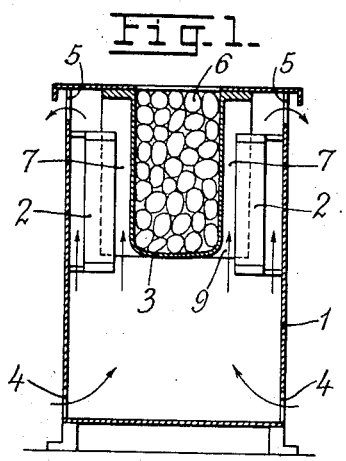
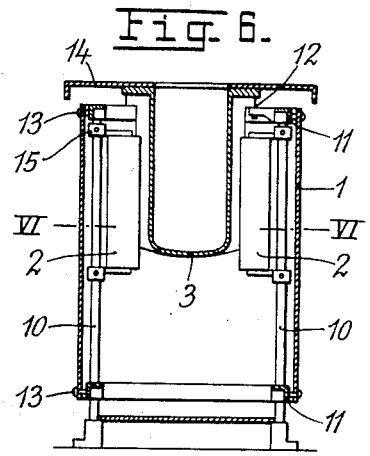
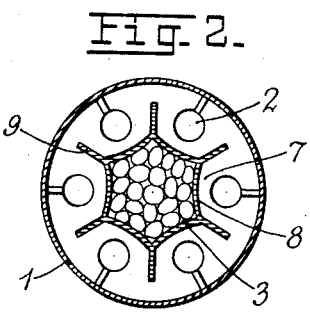
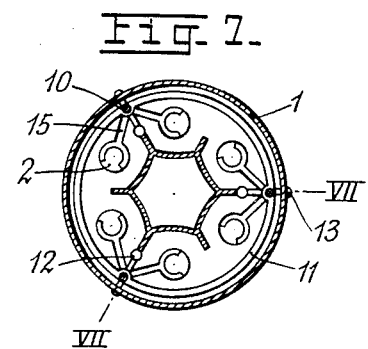
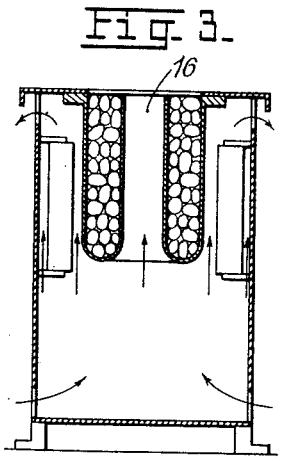
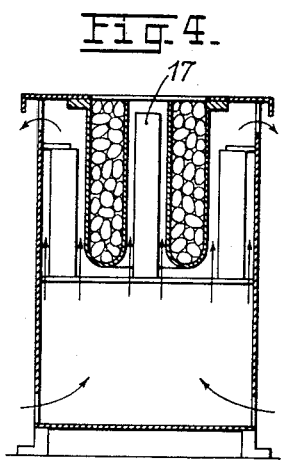
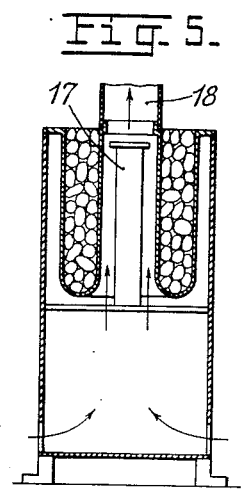
INVENTOR
NICOLAY BUGGE SANDBERG
By:
Haseltine, Lake & Co.
AGENTS Patented Sept. 29, 1953

2,654,018

UNITED STATES PATENT OFFICE 2,654,018

ELECTRICALLY HEATED STEAM-BATH STOVE

Nicolay Bugge Sandberg, Oslo, Norway

Application May 8, 1952, Serial No. 286,733
In Norway May 19, 1951

1 Claim. (Cl. 219—38)

The present invention relates to an electrically heated steam-bath stove for heating air and/or generating steam, in which are one or more rod-shaped electric heating elements, mounted individually in a vertical position at some distance from a heat accumulator for generating steam, whereby hot air in flowing through the stove sweeps around the heat element or elements and is heated by direct contact with same, the heat accumulator being heated by radiant heat from the heating element or elements.

The object of the invention is to obtain a more effective transmission of radiant heat from the vertical electrical heating elements to the heat accumulator for generating steam.

According to the invention the heat accumulator is curved inwardly inside each heating element, thereby forming an interspace of uniform thickness between the elements and the accumulator, and may be provided with ribs projecting between the heat elements, thereby preventing heat radiation between same and increasing the heating surface of the heat accumulator.

Further the heat accumulator can be of annular form with an axial air channel, in which a heating element may be placed, being either the only heat source of the stove or cooperating with heating elements arranged outside the heat accumulator.

Other features of the invention will be evident from the following.

The drawing shows some embodiments of the invention, in which Figs. 1 and 2 show diagrammatically a vertical and a horizontal section respectively through one of these embodiments. Figs. 3, 4 and 5 are diagrammatic vertical sections through other embodiments. Figs. 6 and 7 show examples of the construction of the stove and the manner in which the different parts are mounted on a supporting frame; Fig. 6 shows a vertical section after the line VII—VII in Fig. 7, which again is a section after the line VI—VI in Fig. 6.

The furnace shown in Figures 1 and 2 comprises a tubular outer wall 1 surrounding the electric heating elements 2 and the heat accumulator 3, which in the present case is an iron pot filled with stones. The wall 1 serves as a channel through which the air of the room flows, being heated by the elements 2, the air entering through the opening 4 at the bottom and leaving through the opening 5 at the top of the wall. The inner side of the wall has preferably a heat reflecting surface in order to prevent undesirable heat radiation from the stove.

The wall 1 is preferably cylindric, but can also have a prismatic form and plane walls. The heat accumulator 3 filled with stones 6 is situated centrally in the upper portion of the stove and the heating elements 2 are arranged symmetrically around same. Between the heat accumulator 3 and the heating elements is a space 7 through which air flows upwards in absorbing heat from the elements. The heat accumulator is heated by radiation, the accumulator thereby being heated to a substantially higher temperature than the air layer between the accumulator and the elements. The air layer therefore will cool the elements and prevent overheating of same. The outer wall of the heat accumulator is somewhat curved inside each heating element at 8, and space 7 thereby obtaining a uniform width. Further the receptacle is provided with ribs 9, projecting between the elements. These ribs prevent the elements from mutual radiation, absorb the radiation themselves and transfer same to the heat accumulator.

Fig. 3 shows the heat accumulator provided with a central channel 16 through which the air flows. In Fig. 4 a heating element 17 is provided for in the channel 16 in retaining the outside heating elements 2.

In Fig. 5 the outside elements 2 are removed, the stove thereby being heated only from the inside by the central element 17. In order to increase the air draft through the stove a stack 18 is provided for over the axial channel 16.

Figs. 6 and 7 show how the embodiment shown in Figures 1 and 2 may be constructed. The elements 2, the heat accumulator 3, and the surrounding wall is supported by an inner frame, consisting of vertical rods (legs) 10, connected at the top and bottom by two hoops 11. The upper hoop 11 supports at 12 the heat accumulator 3. The outer wall is supported by the hoops 11 at 13. The top cover 14 is secured to the receptacle 3. The element carrying means 15 are secured to the rods (legs) 10. All the remaining electrical parts or the like are secured to the frame.

I claim:

An air heating and steam producing stove comprising a vertically disposed casing having air inlet and outlet openings formed therein adjacent the bottom and top, respectively, of the casing, a centrally located heat accumulator for generating steam disposed in said casing and spaced from the walls of the latter so that air to be heated can flow upwardly through said casing around said accumulator from said inlet opening to said outlet opening, a circularly arranged series of vertically extending electric heating elements disposed between said accumulator and said walls of the casing for heating the air flowing through said casing by contact with the air and for heating said accumulator by radiation, said accumulator being formed with outwardly concave wall portions concentric with said heating elements, and radially directed ribs extending outwardly from said accumulator between successive ones of said heating elements to increase the surface of said accumulator for receiving heat by radiation from said heating elements and to prevent mutual radiation of heat between said heating elements.

NICOLAY BUGGE SANDBERG.

References Cited in the file of this patent

UNITED STATES PATENTS

| Number | Name | Date |
|---|---|---|
| 1,308,211 | Walder | July 1, 1919 |
| 1,677,553 | Dissett | July 17, 1928 |
| 1,701,096 | Bowling et al. | Feb. 5, 1929 |
| 1,749,969 | Brodin | Mar. 11, 1930 |
| 1,902,074 | Holinger | Mar. 21, 1933 |
| 1,987,936 | Hildebrand | Jan. 15, 1935 |
| 2,064,389 | Smith | Dec. 15, 1936 |
| 2,131,560 | Jaroll | Sept. 27, 1938 |
| 2,256,049 | Gallup | Sept. 16, 1941 |